US008783440B2

(12) United States Patent
Yamazaki et al.

(10) Patent No.: US 8,783,440 B2
(45) Date of Patent: Jul. 22, 2014

(54) SHEET MEMBER POSITION CORRECTING DEVICE AND IMAGE FORMING APPARATUS

(71) Applicants: Tomoyoshi Yamazaki, Tokyo (JP); Rie Ohtsuka, Tokyo (JP)

(72) Inventors: Tomoyoshi Yamazaki, Tokyo (JP); Rie Ohtsuka, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 19 days.

(21) Appl. No.: 13/727,700

(22) Filed: Dec. 27, 2012

(65) Prior Publication Data

US 2013/0168210 A1 Jul. 4, 2013

(30) Foreign Application Priority Data

Dec. 28, 2011 (JP) .................. 2011-287890
Jun. 26, 2012 (JP) .................. 2012-142725

(51) Int. Cl.
*B65G 47/26* (2006.01)
(52) U.S. Cl.
USPC ............ 198/457.02; 271/226; 399/395
(58) Field of Classification Search
USPC ........... 198/411, 412, 413, 457.02, 456, 608; 271/225, 226, 227, 240, 273; 399/395, 399/396
See application file for complete search history.

(56) References Cited

U.S. PATENT DOCUMENTS

| 4,257,586 A * | 3/1981 | Weisbach ............. 271/235 |
| 6,866,264 B2 * | 3/2005 | Dobrindt ............. 271/264 |
| 7,722,039 B2 * | 5/2010 | Shoji et al. ............. 271/273 |
| 7,751,931 B2 * | 7/2010 | Kano ............. 271/227 |
| 7,934,721 B2 * | 5/2011 | De Marco et al. ....... 198/457.02 |
| 7,959,150 B2 * | 6/2011 | Krucinski et al. ............ 271/228 |
| 8,002,275 B2 * | 8/2011 | Hayakawa ............. 271/227 |
| 8,348,266 B2 * | 1/2013 | Deno ............. 271/245 |
| 8,382,104 B2 * | 2/2013 | Yasumoto ............. 271/251 |
| 8,419,013 B2 * | 4/2013 | Muneyasu et al. ............ 271/246 |
| 8,567,775 B2 * | 10/2013 | Banal et al. ............. 271/252 |
| 2008/0054553 A1 | 3/2008 | Muneyasu et al. |
| 2008/0232866 A1 | 9/2008 | Shoji et al. |
| 2008/0232879 A1 | 9/2008 | Shoji et al. |
| 2008/0240821 A1 | 10/2008 | Shoji et al. |
| 2008/0251998 A1 | 10/2008 | Muneyasu et al. |
| 2011/0316226 A1 | 12/2011 | Karikusa et al. |

FOREIGN PATENT DOCUMENTS

| JP | 3268329 | 1/2002 |
| JP | 4110851 | 4/2008 |
| JP | 4566897 | 8/2010 |
| JP | 4614243 | 10/2010 |

* cited by examiner

*Primary Examiner* — James R Bidwell
(74) *Attorney, Agent, or Firm* — Harness, Dickey & Pierce, P.L.C.

(57) ABSTRACT

In a sheet member position correcting device and an image forming apparatus according to the present invention, a controller moves a driving roller toward one end side of the width direction by using a moving unit until a driven roller the position of which is deviated in the width direction with respect to the driving roller abuts on a stopper portion, and, subsequently, the controller further moves the driving roller to a predetermined position toward one end side of the width direction by using the moving unit in a state where the driven roller abuts on the stopper portion to correct the position of the driven roller in the width direction with respect to the driving roller.

18 Claims, 11 Drawing Sheets

SHEET MEMBER POSITION CORRECTING DEVICE AND IMAGE FORMING APPARATUS

CROSS-REFERENCE TO RELATED APPLICATIONS

The present application claims priority to and incorporates by reference the entire contents of Japanese Patent Application No. 2011-287890 filed in Japan on Dec. 28, 2011 and Japanese Patent Application No. 2012-142725 filed in Japan on Jun. 26, 2012.

BACKGROUND OF THE INVENTION

1. Field of the Invention

The present invention relates to a sheet member position correcting device which moves a sheet member in a width direction and corrects a position of the sheet member in the width direction, and an image forming apparatus which has a sheet member position correcting device such as a copying machine, a printer, a facsimile or an MFP.

2. Description of the Related Art

Conventionally, techniques are disclosed of providing a sheet member position correcting device which moves pairs of carriage rollers which are nipping a sheet member in a width direction and corrects positional deviation of the sheet member in the width direction (which is a direction orthogonal to a conveying direction) for an imaging forming device such as a copying machine or a printer (see, for example, Japanese Patent No. 4614243 and Japanese Patent No. 3268329).

Most of these sheet member position correcting devices are each provided with driving rollers and driven rollers which form pairs of carriage rollers which nip and convey sheet members, and moving mechanisms which move the driving rollers and the driven rollers in the width direction. That is, most of the sheet member position correcting devices are each provided with a first moving mechanism which moves the driving rollers in the width direction and a second moving mechanism which moves the driven rollers in the width direction.

In conventional sheet member position correcting devices, two moving mechanisms of the first moving mechanism which moves the driving rollers in the width direction and the second moving mechanism which moves the driven rollers in the width direction are disposed, and therefore the devices become larger and more costly.

To solve such a problem, a measure may be adopted of disposing only moving mechanisms (moving units) which move driving rollers in the width direction without disposing a second driving mechanism which moves the driven rollers.

However, in this case, if the driven rollers are fixed and held such that the driven rollers cannot move in the width direction, when a sheet member nipped by the driving rollers and the driven rollers is moved by the moving mechanisms in the width direction together with the driving rollers, it is not possible to correct the position of the sheet member to move to a target position in the width direction due to sliding friction with the driven rollers.

By contrast with this, if the driven rollers can be moved by friction resistance with the driving rollers in the width direction, when a sheet member nipped by the driving rollers and the driven rollers is moved by the moving mechanisms in the width direction together with the driving rollers, it is possible to correct the position of the sheet member to move to a target position in the width direction. However, when a position of a sheet member having low surface friction resistance is corrected, sliding friction with the sheet member is a little and therefore the driven rollers are not likely to move to the same extent as and together with the sheet member in the width direction and be deviated in the width direction. Further, as such a state is repeated, the positions of the driven rollers in the width direction are significantly deviated from the driving rollers and roller portions of the driving rollers and roller portions of the driven rollers do not abut on each other, and therefore a sheet member cannot be nipped and conveyed by the driving rollers and the driven rollers.

There is needed to solve the above problem, and to provide a sheet member position correcting device and an image forming apparatus which, even when employing a configuration where pairs of carriage rollers formed with driving rollers and driven rollers which nip and convey sheet members are provided and the driven rollers can be driven in the width direction following the driving rollers moved by the moving units in the width direction, corrects the position of the driven rollers in the width direction with respect to the driving rollers without being significantly deviated.

SUMMARY OF THE INVENTION

It is an object of the present invention to at least partially solve the problems in the conventional technology.

A sheet member position correcting device configured to move a sheet member in a width direction orthogonal to a conveying direction and correct a position of the sheet member in the width direction, the sheet member position correcting device comprising: a driving roller configured to be driven by a driving unit which is controlled by a controller to rotate and be able to be moved in the width direction by a moving unit which is controlled by the controller; a driven roller configured to be driven to rotate following the driving roller rotatably driven by the driving unit while pressing against the driving roller and nipping the sheet member, and be able to be driven in the width direction following the driving roller moved by the moving unit in the width direction; and a stopper portion configured to be formed to abut on the driven roller and restrict a moving range of the driven roller in the width direction.

In the sheet member position correcting device, when the sheet member is not nipped between the driving roller and the driven roller, the controller moves the driving roller toward one end side of the width direction by using the moving unit until the driven roller a position of which is deviated in the width direction with respect to the driving roller abuts on the stopper portion, and, subsequently, the controller further moves the driving roller to a predetermined position toward the one end side of the width direction by using the moving unit in a state where the driven roller abuts on the stopper portion to correct the position of the driven roller in the width direction with respect to the driving roller.

An image forming apparatus comprising a sheet member position correcting device configured to move a sheet member in a width direction orthogonal to a conveying direction and correct a position of the sheet member in the width direction.

In the image forming apparatus, the sheet member position correcting device comprises a driving roller configured to be driven by a driving unit which is controlled by a controller to rotate and be able to be moved in the width direction by a moving unit which is controlled by the controller; a driven roller configured to be driven to rotate following the driving roller rotatably driven by the driving unit while pressing against the driving roller and nipping the sheet member, and be able to be driven in the width direction following the driving roller moved by the moving unit in the width direction; and a stopper portion configured to be formed to abut on the driven roller and restrict a moving range of the driven roller in the width direction.

And, in the image forming apparatus, when the sheet member is not nipped between the driving roller and the driven roller, the controller moves the driving roller toward one end side of the width direction by using the moving unit until the driven roller a position of which is deviated in the width direction with respect to the driving roller abuts on the stopper portion, and, subsequently, the controller further moves the driving roller to a predetermined position toward the one end side of the width direction by using the moving unit in a state where the driven roller abuts on the stopper portion to correct the position of the driven roller in the width direction with respect to the driving roller.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
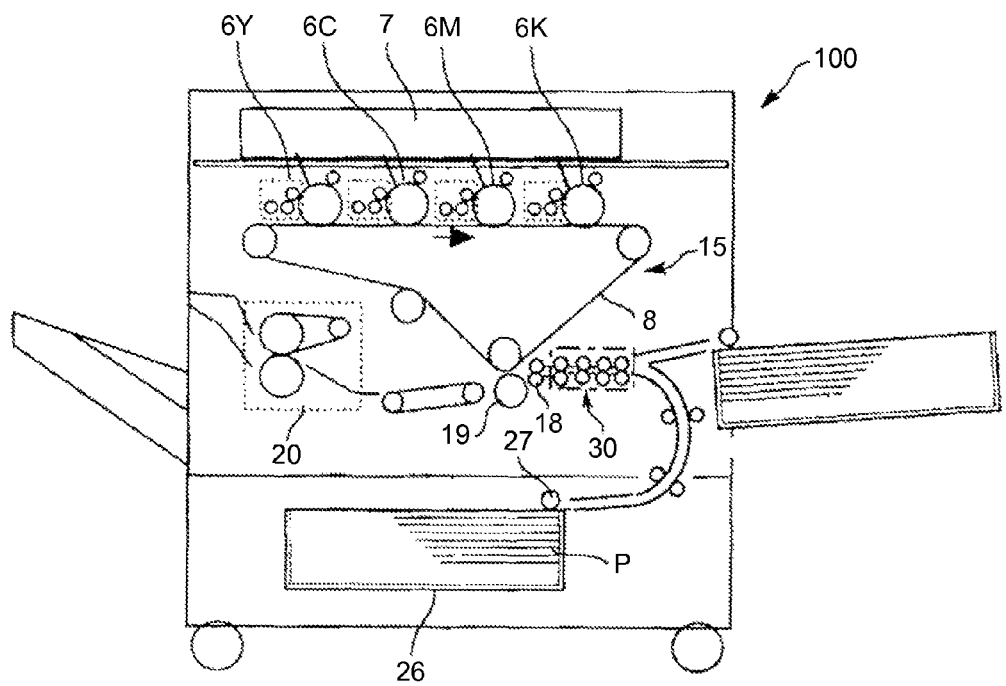
FIG. 1 is an entire configuration diagram illustrating an image forming apparatus according to an embodiment of the present invention.

Hereinafter, an embodiment for implementing the present invention will be described in detail with reference to the drawings. In addition, in each drawing, the same or corresponding portions will be assigned the same reference numerals, and overlapping description thereof will be adequately simplified or omitted.

First, an overall configuration and operation of an image forming apparatus will be described with reference to FIGS. 1 and 2.

Figure 2:
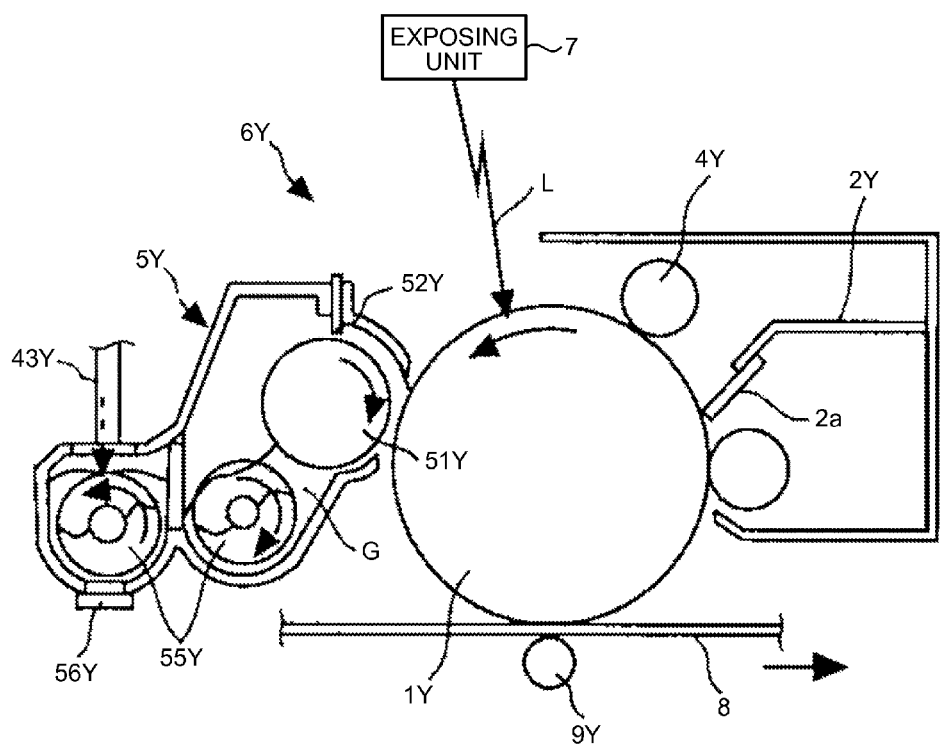
FIG. 2 is a cross-sectional view illustrating an image forming unit.

FIG. 1 is a configuration diagram illustrating a printer which is the image forming apparatus, and FIG. 2 is an enlarged view illustrating an image forming unit of the printer.

As illustrated in FIG. 1, an intermediate transfer belt device 15 is disposed in the center of an image forming apparatus 100. Further, image forming units 6Y, 6M, 6C and 6K corresponding to respective colors (yellow, magenta, cyan and black) are provided in parallel to face an intermediate transfer belt 8 of the intermediate transfer belt device 15. Furthermore, at a position which is on a lower right side of the intermediate transfer belt device 15 and on an upstream side of a conveying direction of registration rollers 18 (timing rollers), a sheet member position correcting device 30 (conveying device) is disposed.

Referring to FIG. 2, the image forming unit 6Y corresponding to yellow has, for example, a photosensitive drum 1Y which is an image carrier, a charging unit 4Y which is arranged around the photosensitive drum 1Y, a developing unit 5Y, a cleaning unit 2Y and a neutralization unit (not illustrated). Further, when image forming process (charging process, exposing process, developing process, transferring process and cleaning process) is performed on the photosensitive drum 1Y, a yellow image is formed on the photosensitive drum 1Y.

In addition, the other three image forming units 6M, 6C and 6K employ the substantially same configuration as in the image forming unit 6Y corresponding yellow except different toner colors to be used, and form images matching respective toner colors. Hereinafter, description of the other three image forming units 6M, 6C and 6K will be adequately omitted, and only the image forming unit 6Y corresponding to yellow will be described.

Referring to FIG. 2, the photosensitive drum 1Y is driven by a driving motor which is not illustrated to rotate in a counterclockwise direction in FIG. 2. Further, at a position of the charging unit 4Y, the surface of the photosensitive drum 1Y is uniformly charged (referred to as "charging process").

Subsequently, the surface of the photosensitive drum 1Y reaches an irradiation position of laser light L emitted from an exposing unit 7, and an electrostatic latent image corresponding to yellow is formed by exposure scanning at this position (referred to as "exposing process").

Subsequently, the surface of the photosensitive drum 1Y reaches a position facing the developing unit 5Y, an electrostatic latent image is developed at this position and a yellow toner image (image) is formed (referred to as "developing process").

Subsequently, the surface of the photosensitive drum 1Y reaches a position facing the intermediate transfer belt 8 and a transfer roller 9Y, and the toner image on the photosensitive drum 1Y is transferred to the intermediate transfer belt 8 at this position (referred to as "primary transferring process"). In this case, untransferred toner slightly remains on the photosensitive drum 1Y.

Subsequently, the surface of the photosensitive drum 1Y reaches a position facing the cleaning unit 2Y, and the untransferred toner remaining on the photosensitive drum 1Y is collected in the cleaning unit 2Y by a cleaning blade 2a at this position (referred to as "cleaning process").

Finally, the surface of the photosensitive drum 1Y reaches a position facing the neutralization unit which is not illustrated, and a residual potential on the photosensitive drum 1Y is removed at this position.

Thus, a series of image forming process performed on the photosensitive drum 1Y are finished.

In addition, the above image forming process is also performed in the other image forming units 6M, 6C and 6K in the same way as in the yellow image forming unit 6Y. That is, the exposing unit 7 disposed above the image forming units radiates the laser light L based on image forming on the photosensitive drums 1M, 1C and 1K of the image forming units 6M, 6C and 6K. More specifically, the exposing unit 7 emits the laser light L from a light source, and radiates the laser light L on the photosensitive drum through a plurality of optical elements while scanning the laser light L by means of a polygon mirror driven to rotate.

Subsequently, a toner image (image) of each color formed on each photosensitive drum through the developing process is overlaid on and transferred to the intermediate transfer belt 8 which is a belt-shaped image carrier. Thus, a color image is formed on the intermediate transfer belt 8.

Figure 3:
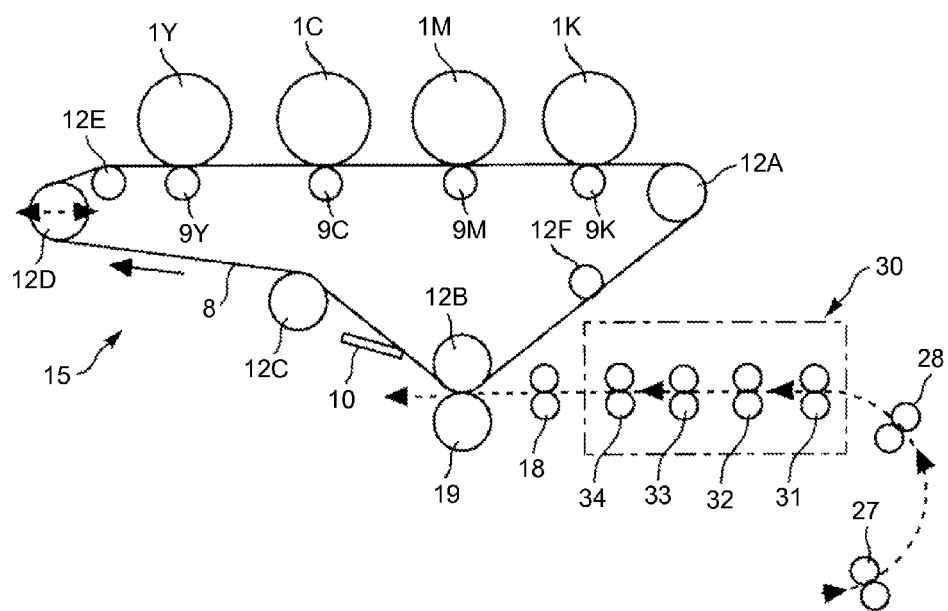
FIG. 3 is a schematic view illustrating a sheet member position correcting device and a vicinity thereof.

Meanwhile, referring to FIG. 3, the intermediate transfer belt device 15 has, for example, the intermediate transfer belt 8, four transfer rollers 9Y, 9M, 9C and 9K, a driving roller 12A, a facing roller 12B, tension rollers 12C to 12F and an intermediate transfer cleaning unit 10. The intermediate transfer belt 8 is bridged and supported by a plurality of roller members 12A to 12F, and is endlessly moved in an arrow direction in FIG. 3 by driving one roller member (driving roller) 12A to rotate.

The four transfer rollers 9Y, 9M, 9C and 9K and the photosensitive drums 1Y, 1M, 1C and 1K nip the intermediate transfer belt 8 to form a primary transfer nip. Further, the transfer rollers 9Y, 9M, 9C and 9K are applied a transfer voltage (transfer bias) which is opposite to a toner polarity.

Further, the intermediate transfer belt 8 (belt-shaped image carrier) runs in the arrow direction, and sequentially passes the primary transfer nip of the transfer rollers 9Y, 9M, 9C and 9K. Thus, the toner image of each color on the photosensitive drums 1Y, 1M, 1C and 1K is overlaid on and primarily transferred to the intermediate transfer belt 8.

Subsequently, the intermediate transfer belt 8 which the toner image of each color is overlaid on and transferred to reaches a position (image transferring portion) facing a secondary transfer roller 19. At this position, the facing roller 12B and the secondary transfer roller 19 nip the intermediate transfer belt 8 to form a secondary transfer nip (image transferring portion). Further, the toner images of four colors formed on the intermediate transfer belt 8 are transferred to a sheet member P such as a transfer sheet conveyed to a position of this secondary transfer nip (referred to as "secondary transfer process"). In this case, untransferred toner which is not transferred to the sheet member P remains on the intermediate transfer belt 8.

Subsequently, the intermediate transfer belt 8 reaches the position of the intermediate transfer cleaning unit 10. Further, the untransferred toner on the intermediate transfer belt 8 is removed at this position.

Thus, a series of transferring process performed on the intermediate transfer belt 8 are finished.

Referring to FIGS. 1 to 3, the sheet member P (recording medium) which is conveyed to the position of the secondary transfer nip is conveyed from a paper feeding unit 26 arranged below the image forming apparatus 100 (or from a paper feeding unit arranged on a lateral side) through, for example, a paper feeding roller 27, a carriage roller 28, the sheet member position correcting device 30 and the registration rollers 18.

More specifically, a plurality of sheet members P such as transfer sheets are overlaid and accommodated in the paper feeding unit 26. Further, when the paper feeding roller 27 is driven to rotate in the counterclockwise direction in FIG. 1, the uppermost sheet member P is fed toward the sheet member position correcting device 30.

The sheet member P conveyed to the position of the sheet member position correcting device 30 is subjected to horizontal registration correction (positional deviation correction in the width direction) at this position, and then is conveyed to the position of the registration rollers 18. Further, the sheet member P conveyed to the position of the registration rollers 18 is conveyed toward the secondary transfer nip (image transferring portion) by the registration rollers 18 at a timing in accordance with the color image on the intermediate transfer belt 8. Thus, a desired color image is transferred to the sheet member P. In addition, a configuration and an operation of the sheet member position correcting device 30 will be further described in detail below using FIGS. 3 to 13.

Subsequently, the sheet member P to which the color image is transferred at the position of the secondary transfer nip is conveyed to the position of a fixing unit 20. Further, at this position, the color image transferred to the surface is fixed on the sheet member P by heat and pressure generated by a fixing roller and a pressure roller.

Subsequently, the sheet member P is discharged outside the device by a pair of discharge rollers (not illustrated). The sheet member P which is discharged outside the device by a pair of discharge rollers is sequentially stacked on a stacking unit as an output image.

Next, the configuration and the operation of the developing unit in the image forming unit will be further described in detail with reference to FIG. 2.

The developing unit 5Y has, for example, a developing roller 51Y which faces the photosensitive drum 1Y, a doctor blade 52Y which faces the developing roller 51Y, two carriage screws 55Y which are arranged in a developer housing unit, a toner supply path 43Y which communicates to the developer housing unit through an opening and a density detection sensor 56Y which detects a toner density in the developer. The developing roller 51Y has, for example, a magnet fixed inside and a sleeve which rotates around the magnet. In the developer housing unit, a two-component developer G which includes a carrier and toner is accommodated.

The developing unit 5Y formed in this way operates as follows.

The sleeve of the developing roller 51Y rotates in the arrow direction in FIG. 2. Further, the developer G which is held on the developing roller 51Y by a magnetic field formed by the magnet moves on the developing roller 51Y following rotation of the sleeve. Meanwhile, a rate of toner (toner density) in the developer G in the developing unit 5Y is adjusted to a predetermined range.

Subsequently, toner supplied into the developer housing unit is blended and churned with the developer G by the two carriage screws 55Y, and circulates in the two insulated developer housing units (move in a vertical direction in FIG. 2). Further, the toner in the developer G adheres to the carrier by way of triboelectric charging with the carrier, and is held on the developing roller 51Y together with the carrier by the magnetic force formed on the developing roller 51Y.

The developer G held on the developing roller 51Y is conveyed in the arrow direction in FIG. 2, and reaches the position of the doctor blade 52Y. Further, the amount of the developer G on the developing roller 51Y is adjusted to an adequate amount at this position, and then the developer G is conveyed to a position (referred to as a "developing area") facing the photosensitive drum 1Y. Furthermore, toner is adhered to the latent image formed on the photosensitive drum 1Y by an electric field formed in the developing area. Subsequently, the developer remaining on the developing roller 51Y goes upward in the developing housing unit following rotation of the sleeve, and is separated from the developing roller 51Y at this position.

Next, the characteristic configuration and operation of the sheet member position correcting device 30 (conveying device) according to the present embodiment will be described in detail using FIGS. 3 to 13.

The sheet member position correcting device 30 according to the present embodiment has a plurality of pairs of carriage rollers 31 to 34 disposed therein, and has a function of nipping and conveying the sheet member P and also has a function of moving the sheet member P in the width direction (a direction which is orthogonal to the conveying direction and which is the vertical direction in FIG. 3) and correcting the position of the sheet member P in the width direction.

Referring to, for example, FIGS. 3 to 7, the sheet member position correcting device 30 according to the present embodiment has, for example, the four pairs of carriage rollers 31 to 34, an upper guide plate 35, a lower guide plate 36 which is a guide plate, an edge position detection sensor unit 60 which serves as a detecting unit, two shift blocks 41 and two moving motors 45.

The four pairs of carriage rollers 31 to 34 have driving rollers 31A to 34A and driven rollers 31B to 34B, respectively.

Figure 4:
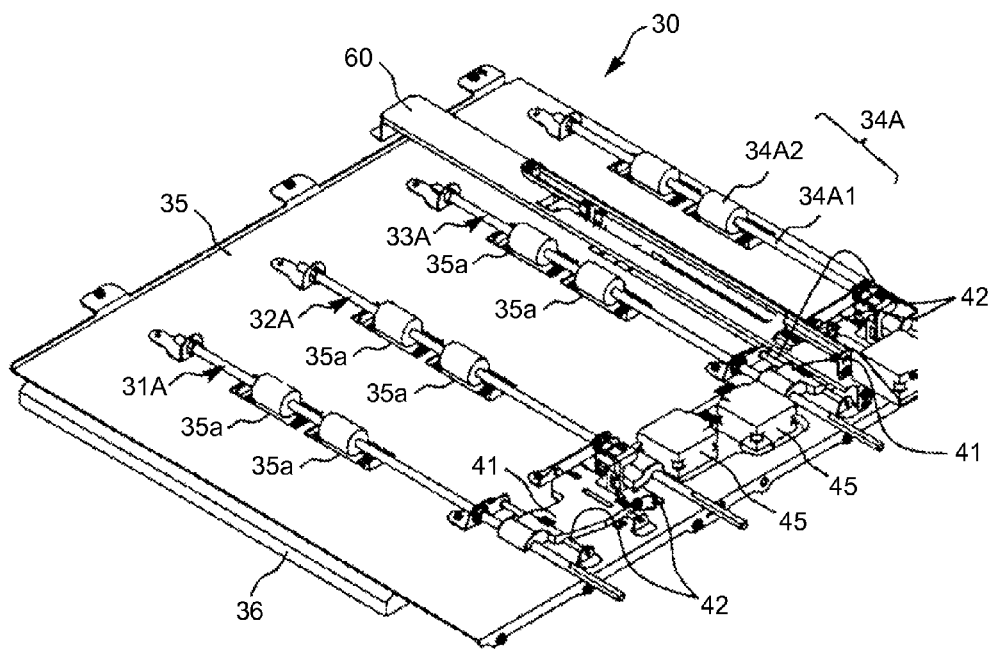
FIG. 4 is a perspective view illustrating the sheet member position correcting device from above.
Figure 5:
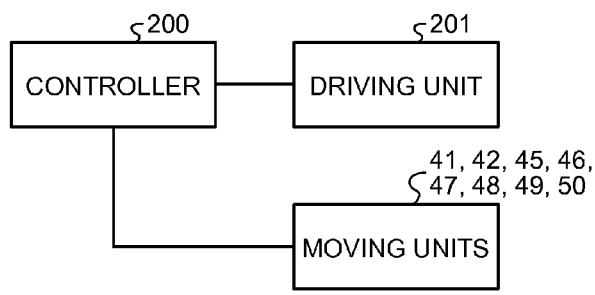
FIG. 5 is a block diagram illustrating relations among the controller, the driving unit, and the moving units.

Referring to FIG. 4, the four driving rollers 31A to 34A are each formed by forming two roller portions with an interval along a shaft portion (see FIG. 4 for a shaft portion 34A1 and roller portions 34A2). Both end portions of the driving rollers 31A to 34A in the width direction (shaft direction and main-scanning direction) are rotatably supported by support portions on the upper guide plate 35, and are driven to rotate in a clockwise direction in FIG. 3 by a driving unit (driving mechanism) 201 that is, as shown in FIG. 5, controlled by a controller 200. Further, when the position of the sheet member P is corrected (upon horizontal registration correction) or the positions of the driven rollers is corrected, the driving rollers 31A to 34A can be moved in the width direction by the moving units that are also, as shown in FIG. 5, controlled by the controller 200. The moving units comprise the shift blocks 41, a shaft portion 42, the moving motors 45, a belt driving unit 46, a timing belt 47, a pulley gear 48, the motor pulley 49, and a rock 50. The moving units 41, 42 and 45 to 50 will be described below.

The upper guide plate 35 guides carriage of the sheet member P, and opening portions 35a are formed therein which expose the roller portions of the driving rollers 31A to 34A to abut on the roller portions of the driven rollers 31B to 34B.

Figure 6:
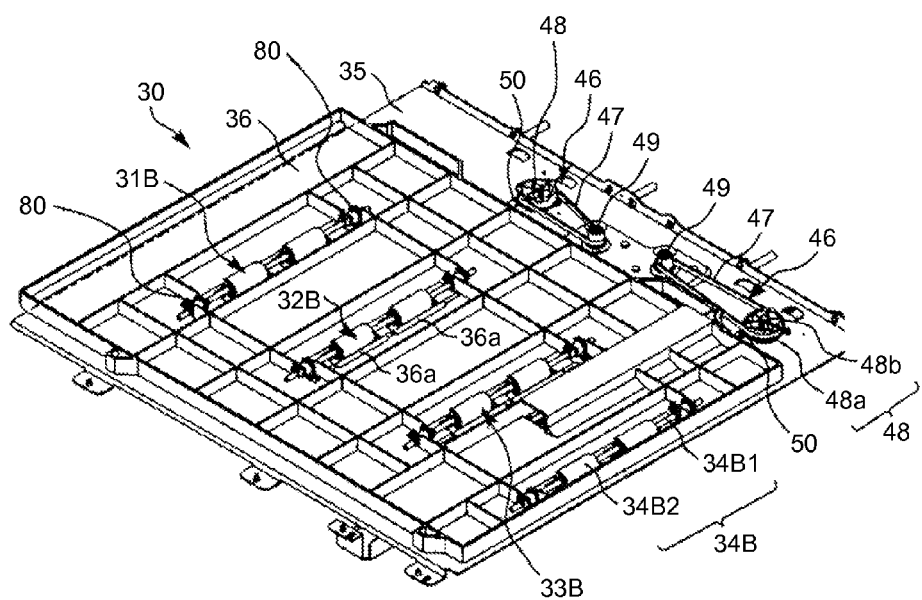
FIG. 6 is a perspective view illustrating the sheet member position correcting device from below.

Referring to FIG. 6, the four driven rollers 31B to 34B are each formed by forming two roller portions with an interval along the shaft portion (see FIG. 6 for a shaft portion 34B1 and roller portions 34B2). Both end portions of the driven rollers 31B to 34B in the width direction are each rotatably supported on the lower guide plate 36 through bearings 80 (pressed toward the driving rollers by pressing springs which are not illustrated).

The lower guide plate 36 guides carriage of the sheet member P, and opening portions 36a are formed therein which expose the roller portions of the driven rollers 31B to 34B to abut on the roller portions of the driving rollers 31A to 34A.

According to this configuration, the roller portions of the driven rollers 31B to 34B and the roller portions of the driving rollers 31A to 34A press against each other to nip the sheet member P therebetween.

Further, although the driven rollers 31B to 34B are not directly connected to the driving unit 201, the driven rollers 31B to 34B are rotated in the counterclockwise direction in FIG. 3 by being driven following the driving rollers 31A to 34A driven by the driving unit 201 to rotate by way of friction resistance with the driving rollers 31A to 34A.

Furthermore, although the driven rollers 31B to 34B are not directly connected to the moving units 41, 42 and 45 to 50, the driven rollers 31B to 34B can be driven following the driving rollers 31A to 34A moved in the width direction by the moving units 41, 42 and 45 to 50 by way of friction resistance with the driving rollers 31A to 34A.

Figure 8:
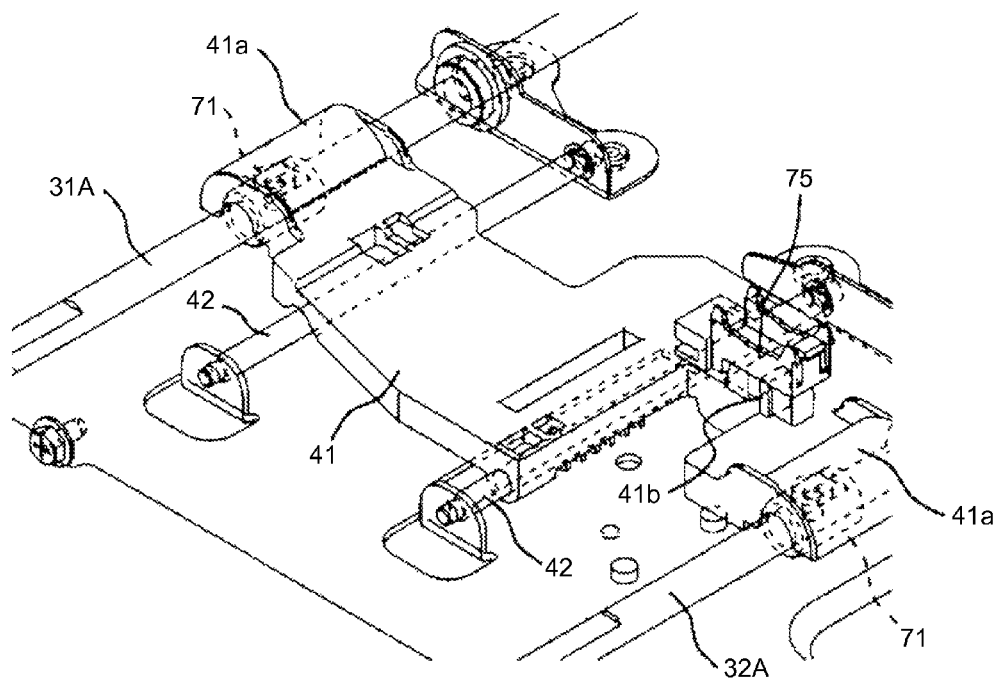
FIG. 8 is an enlarged perspective view illustrating a vicinity of a shift block in the sheet member position correcting device.

Referring to, for example, FIGS. 4 and 8, the two shift blocks 41 (movable plates) are attached movably in the width direction along the shaft portions 42 of the upper guide plate 35. Further, the holding units 41a at both ends of one shift block 41 hold bushes 71 each fixed to the shaft portions of the two driving rollers 31A and 31A (or 33A and 34A). According to this configuration, when the shift block 41 moves in the width direction, the holding units 41a pushes end surfaces of the bushes 71, and the two driving rollers 31A and 31A (or 33A and 34A) also move in the width direction together with the shift block 41.

Further, as illustrated in FIG. 6, a rack 50 is formed in the shift block 41 and enmeshes with a gear portion 48a of a pulley gear 48 arranged turnably on the upper guide plate 35. The moving motors 45 (see FIG. 4) are arranged on the upper guide plate 35. Further, a timing belt 47 is wound around a pulley portion 48b of the pulley gear 48 and a motor pulley 49 fixed to the moving motor 45.

When the moving motor 45 starts running in a belt driving unit 46 formed in this way, power is transmitted to the motor pulley 49, the timing belt 47 and the pulley gear 48, the shift block 41 moves in the width direction and, following this movement, the driving rollers 31A to 34A also move in the width direction. That is, a plurality of above components 41, 42 and 45 to 50 function as moving units which move the driving rollers 31A to 34A in the width direction.

Further, referring to FIG. 8, a position detection sensor 75 which detects the position of the shift block 41 (driving rollers 31A and 32A) in the width direction is arranged on the upper guide plate 35. More specifically, the position detection sensor 75 is a photo sensor which has a light emitting element and a light receiving element, and detects the position of the shift block 41 (driving rollers 31A and 32A) in the width direction by optically detecting whether or not there is a projection portion 41b formed in the shift block 41. Further, it is possible to position the shift block 41 (driving rollers 31A and 32A) at a predetermined position in the width direction.

In addition, although the four driving rollers 31A to 34A are movable in the width direction with the present embodiment, this is because the sheet members P of various sizes having different lengths in the conveying direction need to be supported.

More specifically, when the longest sheet member P is fed, the sheet member P is moved in the width direction (horizontal registration correction is performed) in a state where four pairs of carriage rollers 31 to 34 nip the sheet member P. By contrast with this, when the shortest sheet member P is fed, the sheet member P is moved in the width direction (horizontal registration correction is performed) in a state where two pairs of carriage rollers 32 and 34 on the downstream side nip the sheet member P.

Further, with the present embodiment, the two driving rollers 31A and 32A of the four driving rollers 31A to 34A on an upstream side are moved in the width direction by one shift block 41, and the two driving rollers 33A and 34A on the downstream side are moved in the width direction by the other shift block 41. This is because, if the four driving rollers 31A to 34A are simultaneously moved in the width direction by one driving source (moving unit), when the short sheet member P is moved by the two driving rollers 33A and 34A on the downstream side, a problem occurs that even the next sheet member P which has reached the positions of the driving rollers 31A and 32A on the upstream side is moved in the width direction.

Figure 7:
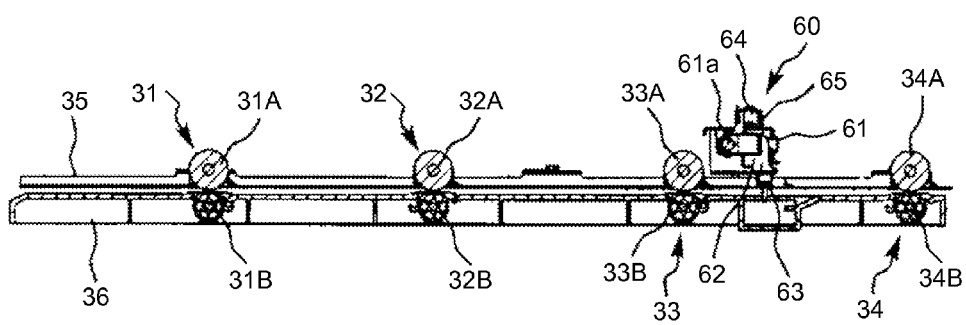
FIG. 7 is a side view illustrating the sheet member position correcting device.
Figure 9:
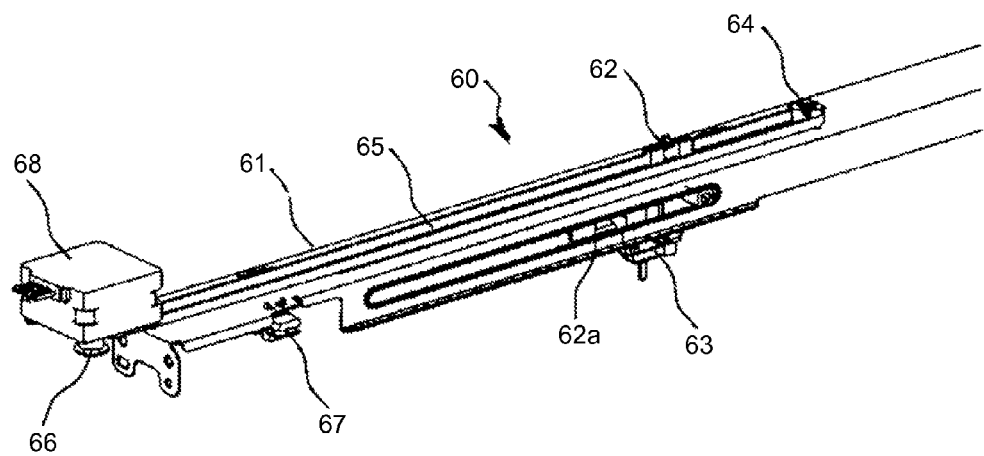
FIG. 9 is an enlarged perspective view illustrating an edge position detection sensor unit in the sheet member position correcting device.

Referring to, for example, FIGS. 4, 7 and 9, at the position which is on the upper guide plate 35 and which is between the two driving rollers 33A and 34A on the downstream side, an edge position detection sensor unit 60 is provided which serves as a detecting unit which detects the position of an end portion of the sheet member P in the width direction.

More specifically, the edge position detection sensor unit 60 (detecting unit) has, for example, a case 61, a bracket 62, an edge position detection sensor 63, a pulley 64 and a timing belt 65.

The edge position detection sensor 63 is fixed to the bracket 62. Further, the bracket 62 is attached to the case 61 movably in the width direction along a shaft portion 61a of the case 61. Furthermore, the timing belt 65 is fixed to the bracket 62, and the timing belt 65 is wound around the pulley 64 which is arranged turnably in the case 61 and a motor pulley 66 of a sensor motor 68 (which is fixed to the upper guide plate 35).

According to this configuration, when the sensor motor 68 starts running, power is transmitted to the motor pulley 66 and the timing belt 65, the edge position detection sensor 63 fixed to the bracket 62 moves in the width direction. Further, a sensor position detection sensor 67 is arranged in the case 61, and, when detecting a projection portion 62a formed in the bracket 62, the sensor position detection sensor 67 detects the position of the edge position detection sensor 63 fixed to the bracket 62 in the width direction. Furthermore, it is possible to move the edge position detection sensor 63 to an arbitrary position in the width direction.

Hereinafter, an operation of detecting the position of an edge (lateral end) of the sheet member P and performing horizontal registration correction (width direction position correction) will be described with reference to FIGS. 10 and 11. In addition, only a case will be described where the sheet member P having a short length in the conveying direction is fed, and a case will not be described where the sheet member P having a long length in the conveying direction is fed.

Figure 10:
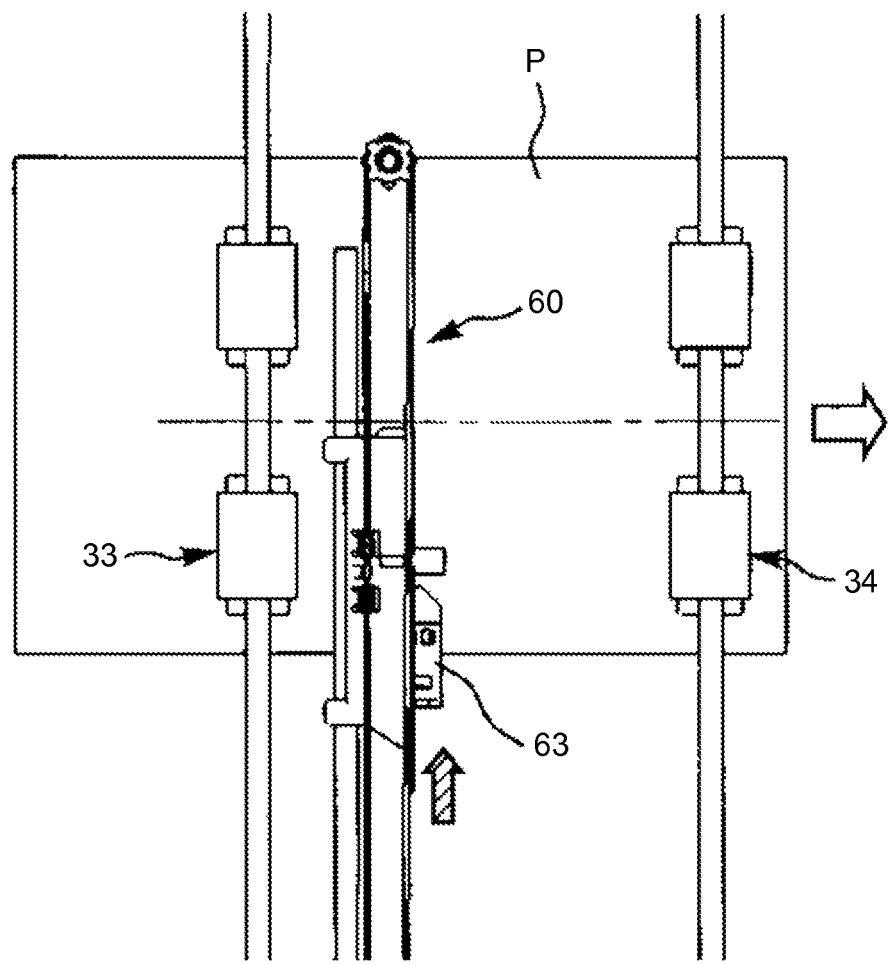
FIG. 10 is a schematic view illustrating an operation of a pair of carriage rollers and the edge position detection sensor when a position of a sheet member is corrected.

As illustrated in FIG. 10, the sheet member P which has reached the position of the sheet member position correcting device 30 moves between the upper guide plate 35 and the lower guide plate 36 (moves in a white arrow direction) while being nipped and conveyed by pairs of rotating carriage rollers 31 to 34. Further, when the front end of the sheet member P passes the position of the third pair of carriage rollers 33 and reaches the position of the edge position detection sensor unit 60, the edge position detection sensor 63 which stands by at a predetermined position (home position) on one end side of the width direction starts moving in a direction to come close to the sheet member P, and moves to a position at which the edge of the sheet member P is detected (moves in a hatching arrow direction).

Furthermore, a moving distance is calculated based on the pulse number at which the edge position detection sensor 63 is moved by the sensor motor 68 (stepping motor) from a home position to the edge position of the sheet member P. Still further, the calculated moving distance and a target distance from the home position to the edge of the sheet member P are compared to obtain the difference in this distance as a correction amount (horizontal registration correction amount) of the sheet member P.

Figure 11:
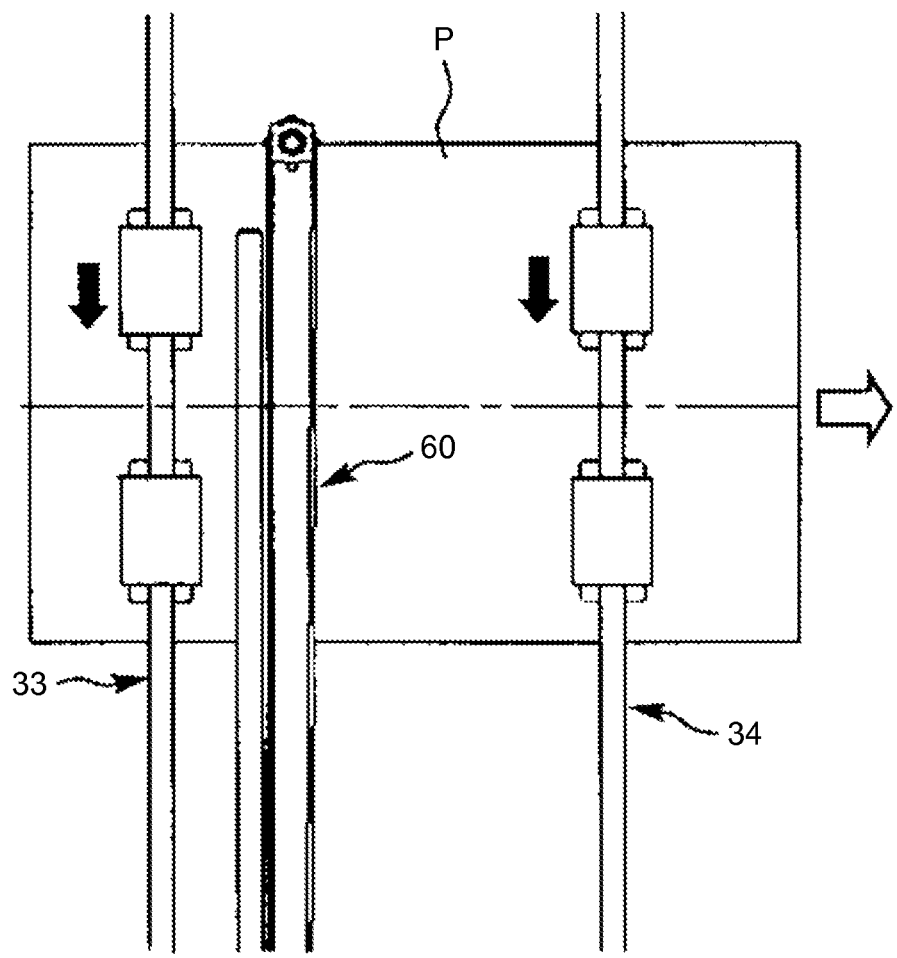
FIG. 11 is a schematic view illustrating an operation of the pair of carriage rollers and the edge position detection sensor subsequent to FIG. 10.

Subsequently, as illustrated in FIG. 11, when the front end (conveying direction front end) of the sheet member P reaches the position of the fourth pair of carriage rollers 34, movement of the driving rollers 33A and 34A in the width direction is started by operating the moving motor 45 in a state where two pairs of carriage rollers 33 and 34 on the downstream side nip the sheet member P. Further, the driving rollers 33A and 34A are moved in the width direction (moved in a black arrow direction in FIG. 11) by the calculated correction amount (horizontal registration correction amount) of the sheet member P. By this means, it is possible to move the sheet member P to a target position in the width direction (perform horizontal registration correction).

Meanwhile, although, when the driving rollers 33A and 34A are moved in the width direction in a state where the pairs of carriage rollers 33 and 34 nip the sheet member P, the driven rollers 33B and 34B which are pressed against the driving rollers 33A and 34A can also be moved in the width direction and can be moved to the same extent as and together with the driving rollers 33A and 34A, slippage occurs between the sheet member P and the driven rollers 33B and 34B and therefore the driven rollers 33B and 34B are moved to a smaller extent than the extent of movement of the driving rollers 33A and 34A and the sheet member P in some cases. That is, when slippage occurs between the sheet member P and the driven rollers 33B and 34B upon horizontal registration correction, positions of the driven rollers 33B and 34B in the width direction with respect to the driving rollers 33A and 34A are deviated. Further, as such a state is repeated, the positions of the driven rollers 33B and 34B in the width direction with respect to the driving rollers 33A and 34A are significantly deviated, and therefore the roller portions of the driving rollers 33A and 34A and the roller portions of the driven rollers 33B and 34B do not abut on each other and the driving rollers 33A and 34A and the driven rollers 33B and 34B cannot nip and convey the sheet member P.

With the present embodiment, to prevent such failure, an operation of correcting relative positions of the driving rollers 33A and 34A and the driven rollers 33B and 34B in the width direction at a predetermined timing is performed.

More specifically, in the sheet member position correcting device 30 according to the present embodiment, stopper portions are provided which are formed to abut on the driven rollers 31B to 34B and which restrict moving ranges of the driven rollers 31B to 34B in the width direction. To be more specific, with the present embodiment, both end portions 36a1 and 36a2 (which are rim portions and see, for example, FIGS. 12 and 13) of the opening portions 36a of the lower guide plate 36 are used for the stopper portions. That is, the both end portions 36a1 and 36a2 (stopper portions) of the opening portions 36a abut on the width direction both end portions of the roller portions of the driven rollers 31B to 34B which move in the width direction to restrict the moving ranges of the driven rollers 31B to 34B in the width direction.

Further, when the sheet member P is not nipped between the driving rollers 31A to 34A and the driven rollers 31B to 34B (for example, immediately after a passing job), the driving rollers 31A to 34A are moved toward one end side of the width direction by the moving units 41, 42 and 45 to 50 until the driven rollers 31B to 34B the positions of which are deviated in the width direction with respect to the driving rollers 31A to 34A abut on the stopper portions 36a1 and 36a2, and, subsequently, the driving rollers 31A to 34A are further moved to predetermined positions toward one end side of the width direction by the moving units 41, 42 and 45 to 50 in a state where the driven rollers 31B to 34B abut on the stopper portions 36a1 and 36a2 to correct positions of the driven rollers 31B to 34B in the width direction with respect to the driving rollers 31A to 34A.

Meanwhile, such control of correcting the positions of the driven rollers 31B to 34B in the width direction with respect to the driving rollers 31A to 34A is directed to moving the driving rollers 31A to 34A to predetermined positions toward one way in the width direction by means of the moving units 41, 42 and 45 to 50 and then moving the driving rollers 31A to 34A to predetermined positions toward the other way in the width direction. That is, when the positions of the driven rollers 31B to 34B are corrected, the driving rollers 31A to 34A are moved to predetermined positions on one end side of the width direction (a side of one end portion 36a1 of the opening portion 36a), and then are moved to predetermined positions on the other end side of the width direction (a side of the other end portion 36a2 of the opening portion 36a).

In addition, the above "predetermined positions" refer to positions set such that the positions of the driving rollers 31A to 34A in the width direction with respect to the driven rollers 31B to 34B which are abutting on the stopper portions 36a1 and 36a2 are normal positions (which are positions which substantially match with the center of the roller portions of both in the width direction).

Hereinafter, the above operation upon correction of the positions of the driven rollers 31B to 34B will be described in detail using FIGS. 12A-12C and 13A-13C. In addition, a case (see FIG. 12A) will be described as an example where the positions of the two driven rollers 33B and 34B on the downstream side need to be corrected, and the third driven roller 33B in particular is deviated in one way in the width direction (upward in FIGS. 12A-12C and 13A-13C) and the fourth driven roller 34B is deviated in the other way in the width direction (downward in FIGS. 12A-12C and 13A-13C).

Figure 12A:
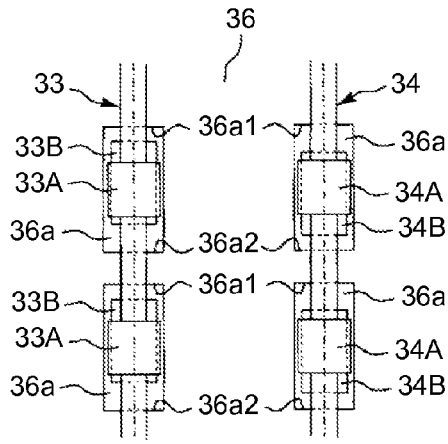
FIGS. 12A to 12C are schematic views illustrating an operation of the pair of the carriage rollers when a position of a driven roller is corrected.
Figure 12B:
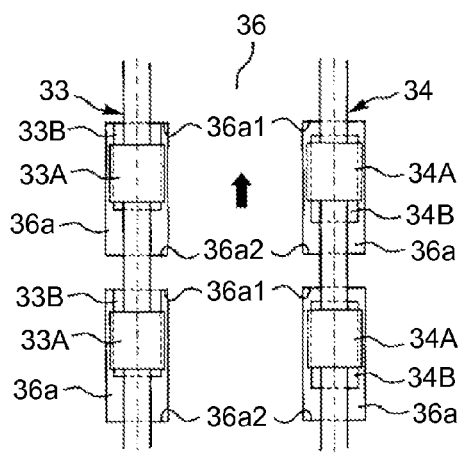
Figure 12C:
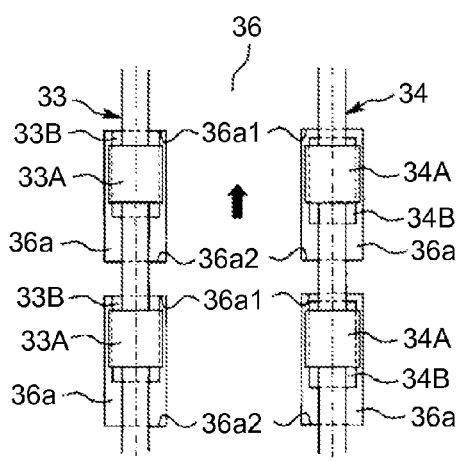

First, when the sheet member P passes the positions of the pairs of carriage rollers 33 and 34 and is no longer nipped by the pairs of carriage rollers 33 and 34, the moving units 41, 42 and 45 to 50 are operated to move the driving rollers 33A and 34A in one way in the width direction (movement from a state in FIG. 12A to a state in FIG. 12B). In this case, the driven rollers 33B and 34B move to the same extent as and together with the driving rollers 33A and 34A while being deviated from the driving rollers 33A and 34A. Further, as illustrated in FIG. 12B, the roller portions of the third driven roller 33B the position of which is deviated toward the moving side abut on one end portion 36a1 (stopper portion) of the opening portion 36a. Furthermore, although, as illustrated in FIG. 12C, the moving units 41, 42 and 45 to 50 are continuously operated and the driving rollers 33A and 34A further move in one way in the width direction, the third driven roller 33B abuts on the stopper portion 36a1 in this case and therefore stays there against the friction resistance with the driving roller 33A (movement thereof is restricted). Still further, when the driving rollers 33A and 34A stop at predetermined positions in one way in the width direction, the position of the third driven roller 33B with respect to the third driving roller 33A is corrected (which is a state in FIG. 12C). In addition, in process in FIGS. 12A to 12C, positions of driven rollers which are deviated in one way in the width direction are corrected, and the position of the fourth driven roller 34B which is deviated in the other way in the width direction is not corrected.

Figure 13A:
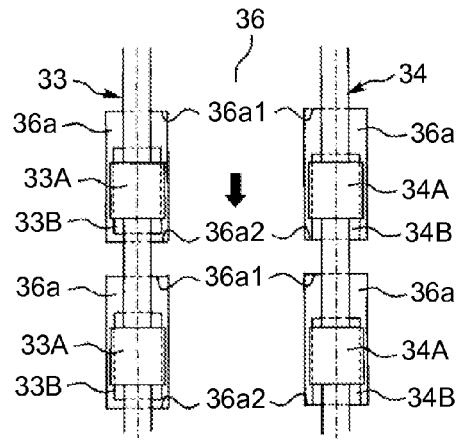
FIGS. 13A to 13C are schematic views illustrating an operation of the pair of the carriage rollers subsequent to FIGS. 12A to 12C.
Figure 13B:
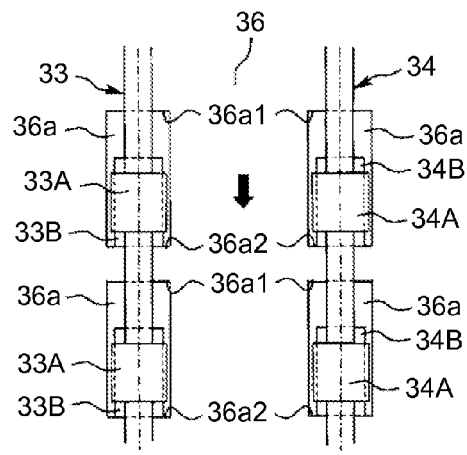

Next, after correction of the position of the third driven roller 33B is finished, the moving units 41, 42 and 45 to 50 are operated to move the driving rollers 33A and 34A in the other way in the width direction (movement from the state in FIG. 12C to a state in FIG. 13A). In this case, the two driven rollers 33B and 34B move to the same extent as and together with the driving rollers 33A and 34A while maintaining relative positions with respect to the corresponding driving rollers 33A and 34A. Further, as illustrated in FIG. 13A, the roller portions of the fourth driven roller 34B the position of which is deviated toward the moving side abut on the other end portion 36a2 (stopper portion) of the opening portion 36a. Furthermore, although, as illustrated in FIG. 13B, the moving units 41, 42 and 45 to 50 are continuously moved and the driving rollers 33A and 34A further move in the other way in the width direction, the fourth driven roller 34B abuts on the stopper portion 36a2 in this case, and therefore stays there against the friction resistance with the driving roller 34A (movement thereof is restricted.). Still further, when the driving rollers 33A and 34A stop at predetermined positions in the other way in the width direction, the position of the fourth driven roller 34B with respect to the fourth driving roller 34A is corrected (which is a state in FIG. 13C). In addition, in process in FIGS. 13A and 13B, the position of a driven roller the position of which is deviated in the other way in the width direction is corrected, and the position of the third driven roller 33B, the position of which has already been corrected, is not further corrected.

Thus, by moving the driving rollers 33A and 34A bidirectionally in the width direction, even if positions of the driven rollers 33B and 34B are deviated in one way in the width direction, it is possible to reliably correct the positions.

Figure 13C:
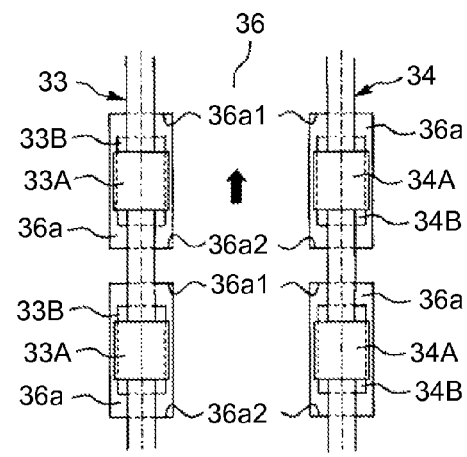

Further, lastly, as illustrated in FIG. 13C, after correction of the positions of both of the driven rollers 33B and 34B is finished, the moving units 41, 42 and 45 to 50 are operated to move the driving rollers 33A and 34A in one way in the width direction and position the roller portions of the driving rollers 33A and 34A and the roller portions of the driven rollers 33B in the center of the opening portion 36a in the width direction. Then, the next passing job is prepared.

Meanwhile, a configuration has been employed with the present embodiment where the roller portions of the driven rollers 31B to 34B (which are members which abut on the roller portions of the driving rollers 31A to 34A and nip and convey sheet members) directly abut on the stopper portions 36a1 and 36a2, and the positions of the driven rollers 31B to 34B in the width direction with respect to the driving rollers 31A to 34A are corrected.

By contrast with this, a configuration may be employed where the roller portions of the driven rollers 31B to 34B indirectly abut on the stopper portions 36a1 and 36a2, and the positions of the driven rollers 31B to 34B in the width direction with respect to the driving rollers 31A to 34A are corrected.

Hereinafter, a specific example of this configuration will be described using FIGS. 14 and 15. In addition FIGS. 14 and 15 simplify and illustrate as a representative only the third pair of carriage rollers 33 of four pairs of carriage rollers 31 to 34 employing substantially the same configuration.

Figure 14:
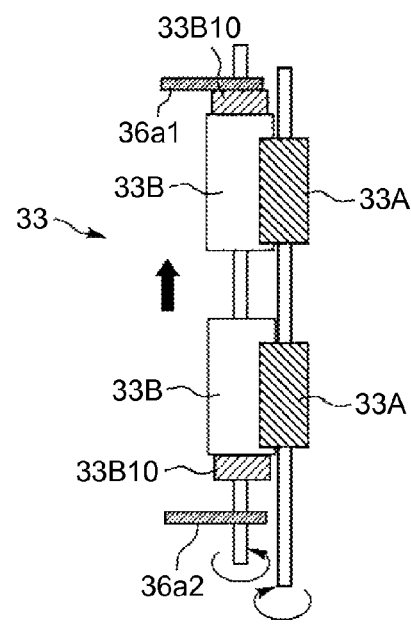
FIG. 14 is a schematic view illustrating the pair of carriage rollers and a vicinity thereof according to a first modified example.

In a first modified example, referring to FIG. 14, abutting members 33B10 are fixed to end portions (end portions opposing to the stopper portions 36a1 and 36a2) of the roller portions of the driven roller 33B (in which roller portions are formed along a shaft portion) in the width direction. This abutting member 33B10 is a virtually cylindrical member which is made of a resin material or a metal material which has friction-resistance and low resistance and which is disposed along the shaft portion of the driven roller 33B, and which is formed rotatably with the driven roller 33B. Further, the abutting members 33B10 directly abut on the stopper portions 36a1 and 36a2 when the position of the driven roller 33B in the width direction is corrected as described using, for example, FIGS. 12 and 13. That is, the abutting members 33B10 are formed to directly abut on the stopper portions 36a1 and 36a2 such that the roller portions of the driven roller 33B do not directly abut on the stopper portions 36a1 and 36a2.

Further, the abutting members 33B10 are configured not to block the above operation of correcting the position of the driven roller 33B in the width direction and, in addition, the operation of the driving roller 33A and the driven roller 33B of nipping and conveying the sheet member P. More specifically, the abutting members 33B10 have outer diameters which are set smaller than the outer diameters of the roller portions of the driven roller 33B, and are arranged at positions at which the abutting members 33B10 do not abut on the roller portions of the driving roller 33A even when the position of the driven roller 33B in the width direction is further corrected.

According to this configuration, failure that the roller portions of the driven roller 33B directly slide against the stopper portions 36a1 and 36a2 and friction occurs on the roller portions is reduced. Further, failure that the roller portions of the driven roller 33B directly abut on the stopper portions 36a1 and 36a2 and prevent rotation of the driven roller 33B is reduced.

Figure 15:
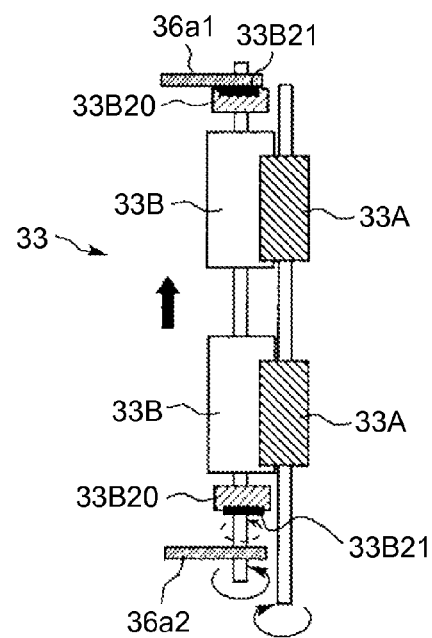
FIG. 15 is a schematic view illustrating the pair of carriage rollers and a vicinity thereof according to a second example.

In a second modified example, referring to FIG. 15, abutting members 33B20 are disposed at positions apart from the width direction end portions (which are end portions facing the stopper portions 36a1 and 36a2) of the roller portions of the driven roller 33B (in which the roller portions are formed along the shaft portion). This abutting member 33B20 is a roller-shaped member which is made of a resin material or a metal material which has friction-resistance and low resistance, and is held rotatably along the shaft portion of the driven roller 33B independently from rotation of the driven roller 33B at a position at which the abutting member 33B20 does not abut on the driving roller 33A. That is, the abutting member 33B20 has a fixed relative position in the shaft direction (an interval to the roller portions) in the driven roller 33B, and is disposed to relatively rotate with respect to the shaft portion of the driven roller 33B at the position.

Further, these abutting members 33B20 directly abut on the stopper portions 36a1 and 36a2 when the position of the driven roller 33B in the width direction is corrected as described above using, for example, FIGS. 12 and 13. That is, the abutting members 33B20 are formed to directly abut on the stopper portions 36a1 and 36a2 such that the roller portions of the driven roller 33B do not directly abut on the stopper portions 36a1 and 36a2.

Further, the abutting members 33B20 are configured not to block the above operation of correcting the position of the driven roller 33B in the width direction and, in addition, the operation of the driving roller 33A and the driven roller 33B of nipping and conveying the sheet member P. More specifically, the abutting member 33B20 have outer diameters which are set smaller than the outer diameters of the roller portions of the driven roller 33B, and are arranged at positions at which the abutting members 33B20 do not abut on the roller portions of the driving roller 33A even when the position of the driven roller 33B in the width direction is further corrected.

According to this configuration, failure that the roller portions of the driven roller 33B directly slide against the stopper portions 36a1 and 36a2 and friction occurs on the roller portions is reduced. Further, failure that the roller portions of the driven roller 33B directly abut on the stopper portions 36a1 and 36a2 and prevent rotation of the driven roller 33B is reduced. The abutting members 33B20 in FIG. 15 in particular are configured to rotate independently from rotation of the driven roller 33B, so that the above effect is further exhibited.

Meanwhile, in part of abutting planes (facing planes) which abut on the stopper portions 36a1 and 36a2 of the abutting members 33B20 in FIG. 15, buffers 33B21 made of an elastic material such as expanded polyurethane are disposed projecting toward the stopper portions 36a1 and 36a2 from the abutting planes.

By this means, colliding sounds caused when the abutting members 33B20 abut on the stopper portions 36a1 and 36a2 are reduced.

In addition, when the abutting members 33B20 abut on the stopper portions 36a1 and 36a2, the abutting members 33B20 are preferably crushed by the stopper portions 36a1 and 36a2 and elastically deformed to a position on the same planes as the abutting planes such that precision to correct the position of the driven roller 33B in the width direction is not influenced.

As described above, even when employing a configuration where pairs of carriage rollers 31 to 34 formed with the driving rollers 31A to 34A and the driven rollers 31B to 34B which nip and convey the sheet member P are provided, and the driven rollers 31B to 34B can be driven in the width direction following the driving rollers 31A to 34A moved in the width direction by the moving units 41, 42 and 45 to 50, the image forming apparatus according to the present embodiment moves the driving rollers 31A to 34A toward one end side of the width direction by means of the moving units 41, 42 and 45 to 50 and further moves the driving rollers 31A to 34A to predetermined positions toward one end side of the width direction in a state where the driven rollers 31B to 34B abut on the stopper portions 36a1 and 36a2, so that it is possible to correct the positions of the driven rollers 31B to 34B in the width direction with respect to the driving rollers 31A to 34A without being significantly deviated.

In addition, although the sheet member position correcting device 30 is provided closer to the upstream side of the conveying direction than the registration rollers 18 with the present embodiment, the position to dispose the sheet member position correcting device 30 is not limited to this.

Further, although the present invention is applied to the sheet member position correcting device 30 which corrects the position of a recording medium (transfer sheet) which is the sheet member P on which an image is formed with the present embodiment, the present invention is naturally applicable to a sheet member position correcting device which corrects the position of document which is the sheet member P.

Furthermore, although the present invention is applied to the sheet member position correcting device 30 which is disposed in the electrophotography image forming apparatus 100 with the present embodiment, the present invention is naturally applicable to a sheet member position correcting device which is disposed in image forming apparatus of other systems (for example, inkjet image forming apparatus).

Still further, in those cases, it is also possible to obtain the same effect as in the present embodiment.

Moreover, with the present embodiment, the both end portions 36a1 and 36a2 (rim portions) of the opening portions 36a of the lower guide plate 36 are used for stopper portions which restrict the moving ranges of the driven rollers 31B to 34B in the width direction. However, the stopper portions are not limited to these, and stopper portions of any mode (for example, projection portions which project toward a side of a plane of the lower guide plate 36 on which conveyance is not carried out) can be used as long as these stopper portions can abut on the driven rollers 31B to 34B without preventing the sheet member P from being conveyed.

Further, in this case, it is also possible to obtain the same effect as in the present embodiment.

The present invention can provide a sheet member position correcting device and an image forming apparatus which, even when employing a configuration where pairs of carriage rollers formed with driving rollers and driven rollers which nip and convey sheet members are provided and the driven rollers can be driven in the width direction following the driving rollers moved by the moving units in the width direction, moves the driving rollers toward one end side of the width direction by means of the moving units at a predetermined timing and further moves the driving rollers toward one end side of the width direction in a state where the driven rollers abut on stopper portions, and, consequently, corrects the positions of the driven rollers in the width direction with respect to the driving rollers without being significantly deviated.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A sheet member position correcting device configured to move a sheet member in a width direction orthogonal to a conveying direction and correct a position of the sheet member in the width direction, the sheet member position correcting device comprising:
    a driving roller configured to be driven by a driving unit which is controlled by a controller to rotate and be able to be moved in the width direction by a moving unit which is controlled by the controller;
    a driven roller configured to be driven to rotate following the driving roller rotatably driven by the driving unit while pressing against the driving roller and nipping the sheet member, and be able to be driven in the width direction following the driving roller moved by the moving unit in the width direction; and
    a stopper portion configured to be formed to abut on the driven roller and restrict a moving range of the driven roller in the width direction,
    wherein, when the sheet member is not nipped between the driving roller and the driven roller, the controller moves the driving roller toward one end side of the width direction by using the moving unit until the driven roller a position of which is deviated in the width direction with respect to the driving roller abuts on the stopper portion, and, subsequently, the controller further moves the driving roller to a predetermined position toward the one end side of the width direction by using the moving unit in a state where the driven roller abuts on the stopper portion to correct the position of the driven roller in the width direction with respect to the driving roller.

2. The sheet member position correcting device according to claim 1, wherein control of the position of the driven roller in the width direction with respect to the driving roller includes moving the driving roller toward one way in the width direction by the controller with using the moving unit and then moving the driving roller to a predetermined position toward the other way in the width direction.

3. The sheet member position correcting device according to claim 1, wherein the predetermined position is set such that the position of the driving roller in the width direction with respect to the driven roller which is abutting on the stopper portion is a normal position.

4. The sheet member correcting device according to claim 1, further comprising a guide plate configured to guide conveyance of the sheet member and comprise an opening portion which exposes a roller portion of the driven roller to abut on a roller portion of the driving roller,
    wherein the stopper portion is both end portions of the opening portion formed to directly or indirectly abut on both end portions of the roller portion of the driven roller in the width direction.

5. The sheet member position correcting device according to claim 1, wherein the driven roller comprises an abutting member configured to be fixed to an end portion of a roller portion of the driven roller in the width direction, and be formed to rotate with the driven roller, and be formed to directly abut on the stopper portion.

6. The sheet member position correcting device according to claim 1, wherein, at a position where the driven roller does not abut on the driving roller, the driven roller comprises an abutting member configured to be rotatably held independently from rotation of the driven roller and be formed to directly abut on the stopper portion.

7. The sheet member position correcting device according to claim 5, wherein the abutting member comprises a buffer in part of an abutting plane which abuts on the stopper portion.

8. The sheet member position correcting device according to claim 6, wherein the abutting member comprises a buffer in part of an abutting plane which abuts on the stopper portion.

9. The sheet member position correcting device according to claim 1, further comprising a detecting unit configured to detect a position of an end portion of the sheet member in the width direction,
    wherein the controller controls the moving unit to move the driving roller in the width direction based on a detection result of the detecting unit to correct the position of the sheet member nipped between the driving roller and the driven roller in the width direction.

10. An image forming apparatus comprising a sheet member position correcting device configured to move a sheet member in a width direction orthogonal to a conveying direction and correct a position of the sheet member in the width direction, wherein
    the sheet member position correcting device comprises,
        a driving roller configured to be driven by a driving unit which is controlled by a controller to rotate and be able to be moved in the width direction by a moving unit which is controlled by the controller;
        a driven roller configured to be driven to rotate following the driving roller rotatably driven by the driving unit while pressing against the driving roller and nipping the sheet member, and be able to be driven in the width direction following the driving roller moved by the moving unit in the width direction;
        a stopper portion configured to be formed to abut on the driven roller and restrict a moving range of the driven roller in the width direction, and
        wherein, when the sheet member is not nipped between the driving roller and the driven roller, the controller moves the driving roller toward one end side of the width direction by using the moving unit until the driven roller a position of which is deviated in the width direction with respect to the driving roller abuts on the stopper portion, and, subsequently, the controller further moves the driving roller to a predetermined position toward the one end side of the width direction by using the moving unit in a state where the driven roller abuts on the stopper portion to correct the position of the driven roller in the width direction with respect to the driving roller.

11. The image forming apparatus according to claim 10, wherein control of correcting the position of the driven roller in the width direction with respect to the driving roller includes moving the driving roller toward one way in the width direction by the controller with using the moving unit and then moving the driving roller to a predetermined position toward the other way in the width direction.

12. The image forming apparatus according to claim 10, wherein the predetermined position is set such that the position of the driving roller in the width direction with respect to the driven roller which is abutting on the stopper portion is a normal position.

13. The image forming apparatus according to claim 10, wherein the sheet member correcting device further comprises a guide plate configured to guide conveyance of the sheet member and comprise an opening portion which exposes a roller portion of the driven roller to abut on a roller portion of the driving roller, and the stopper portion is both end portions of the opening portion formed to directly or indirectly abut on both end portions of the roller portion of the driven roller in the width direction.

14. The image forming apparatus according to claim 10, wherein the driven roller comprises an abutting member configured to be fixed to an end portion of a roller portion of the driven roller in the width direction, and be formed to rotate with the driven roller, and be formed to directly abut on the stopper portion.

15. The image forming apparatus according to claim 10, wherein, at a position where the driven roller does not abut on the driving roller, the driven roller comprises an abutting member configured to be rotatably held independently from rotation of the driven roller and be formed to directly abut on the stopper portion.

16. The image forming apparatus according to claim 14, wherein the abutting member comprises a buffer in part of an abutting plane which abuts on the stopper portion.

17. The image forming apparatus according to claim 15, wherein the abutting member comprises a buffer in part of an abutting plane which abuts on the stopper portion.

18. The image forming apparatus according to claim 10, wherein the sheet member correcting device further comprises a detecting unit configured to detect a position of an end portion of the sheet member in the width direction, and the controller controls the moving unit to move the driving roller in the width direction based on a detection result of the detecting unit to correct the position of the sheet member nipped between the driving roller and the driven roller in the width direction.

* * * * *